Jan. 13, 1970   H. T. WEISBRICH, JR   3,490,023

INDUCED DOPPLER DIRECTION FINDER

Filed Aug. 26, 1968

*INVENTOR.*
HENRY T. WEISBRICH, JR.
BY
ROY MILLER
ATTORNEY.

3,490,023
INDUCED DOPPLER DIRECTION FINDER
Henry T. Weisbrich, Jr., China Lake, Calif., assignor to the United States of America as represented by the Secretary of the Navy
Filed Aug. 26, 1968, Ser. No. 755,307
Int. Cl. G01s 5/02, 3/04
U.S. Cl. 343—113       5 Claims

ABSTRACT OF THE DISCLOSURE

A direction finder which determines the location of a radiating source by introducing a Doppler component onto the signal from the source via independently rotating reflecting elements. The induced Doppler component will reach a maximum when the rotating elements are moving toward the source and a minimum when orthogonal to the source. By comparing the radiated signal with the Doppler shifted signal, the bearing of the radiating source can be determined.

---

The invention described herein may be manufactured and used by or for the Government of the United States of America for governmental purposes without the payment of any royalties thereon or therefor.

BACKGROUND OF THE INVENTION

In a classical Doppler direction finder, a receiving antenna is rotated so that it alternately recedes from and approaches a radiating source. During the approach to the source there will be a positive Doppler shift and while receding, the Doppler shift will be negative.

By comparing the phase of rotation of the receiving antenna to the phase of the induced Doppler frequency shifts, the bearing of the radiating source can be extracted.

Many Doppler direction finding systems rely on rotation of large antennas at relatively high speeds to induce significant Doppler components to permit determination of the bearing of the radiating source.

SUMMARY OF THE INVENTION

In accordance with the present invention, a moving belt on which reflectors are mounted provides a Doppler shift for incident radiation. The Doppler shift will be maximum when the rotating elements are moving towards the source, and minimum when the rotating elements are orthogonal to the source.

Antenna means are provided to pick up the radiated signal and the Doppler shifted signal. The signals are detected, mixed and fed to signal processor where the Doppler component is extracted, thus permitting the bearing of the radiating source to be determined.

DESCRIPTION OF THE PREFERRED EMBODIMENTS

Figure 1:
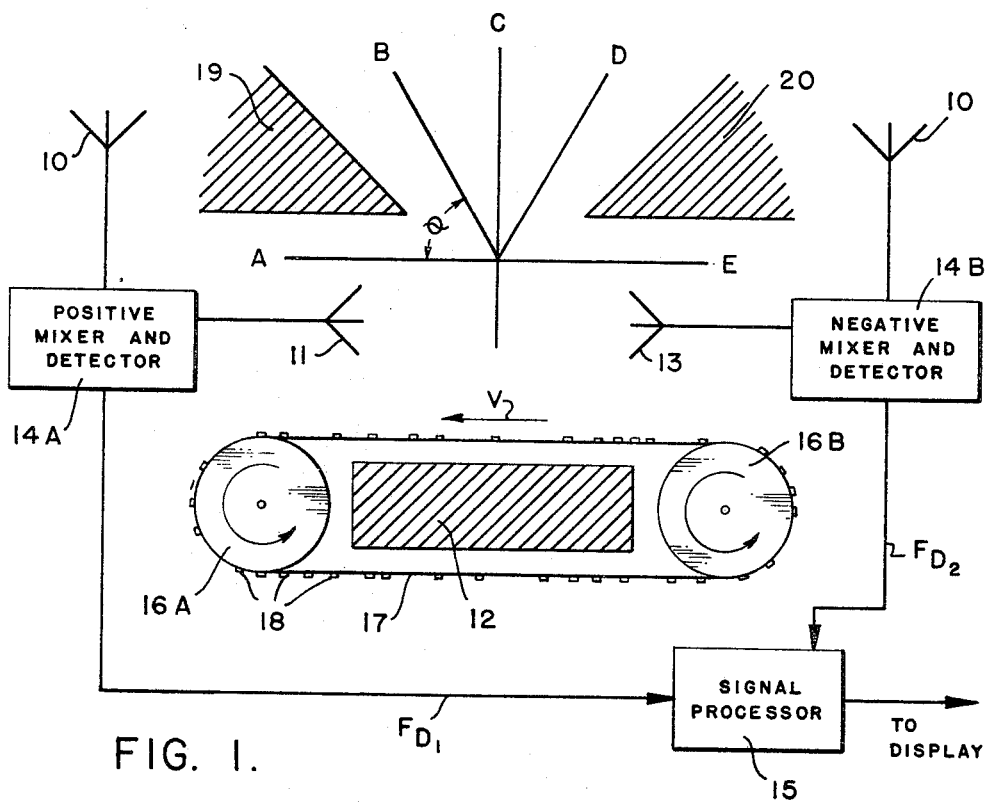
FIG. 1 is a schematic of a preferred embodiment of the invention.

Referring to FIG. 1, an endless belt 17 is shown disposed upon idler roller 16A and drive roller 16B. The drive roller causes the belt to move in a counter clockwise direction. Attached to belt 17 are closely and randomly spaced metal reflectors 18.

Absorbing material 12 is placed in the area enclosed by the endless belt to prevent internal reflection of radio frequencies. Wedge-shaped sections 19 and 20 of absorbent material are additionally disposed to prevent reflection of a remote signal which impinges upon the moving endless belt.

Radio frequencies from a remote source impinge upon the rotating belt of some angle $\theta$. A receiving antenna 10 is placed to receive the remote signal for use as a reference.

A second receiving antenna 11 is disposed to receive the remote signal as reflected from endless belt 17. The signal received by antenna 11 will contain a positive Doppler component. Positive mixer and detector 14A detects the reference and positive Doppler shifted signals, then mixes them.

Similarly, a third receiving antenna 13 is disposed to receive the remote signal containing a negative Doppler component as reflected from endless belt 17. The reference signal and the signal received by antenna 13 are detected and mixed by negative mixer and detector 14B.

Figure 2:
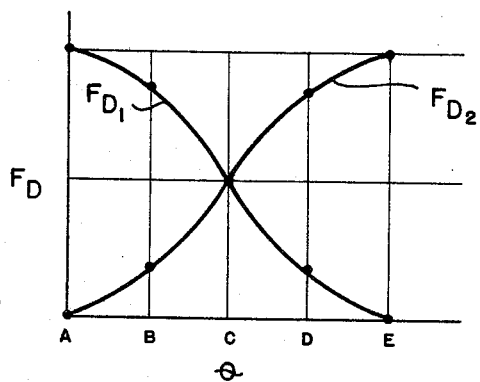
FIG. 2 is a graph showing the induced Doppler values.

FIG. 2 shows the effect of the bearing of the remote signal on the Doppler components induced in the remote signal by moving endless belt 17. When the remote signal is received at a bearing such that the angle $\theta$ is equal to zero, the source is at position A and Doppler components $F_{D_1}$ and $F_{D_2}$ are maximum positive and maximum negative respectively. As $\theta$ increases $F_{D_1}$ decreases, then passes through zero to approach a maximum negative. At the same time, $F_{D_2}$ decreases towards zero, passes through zero to approach a maximum positive. When $\theta=90°$, $F_{D_1}=F_{D_2}=$null; at $\theta=0°$, $F_{D_1}=F_{D_2}=F_{D_{maximum}}$; and at $\theta=180°$, $-F_{D_1}=F_{D_2}=F_{D_{maximum}}$.

The ouput of positive mixer and detector 14A, $F_{D_1}$, and the output of negative mixer and detector 14B, $F_{D_2}$, are fed to a signal processor 15 which extracts the bearing from the induced Doppler components. Signal processor 15 may be a galvanometer calibrated to indicate a null when endless belt 17 is orthogonal to the source.

Bearing is determined by orienting endless belt 17 in various directions. When the galvanometer reaches a null, the bearing can be determined from the position of endless belt 17. A selsyn system responsive to the position of endless belt 17 could provide a direct readout in bearing.

Figure 3:
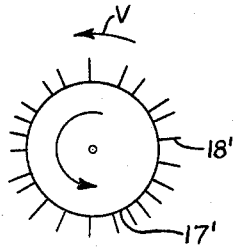
FIG. 3 is a schematic of an alternate embodiment of the reflector array according to the present invention.

Endless belt 17 may be replaced by a disk 17' having a plurality of metal rods 18' inserted radially into its rim, as shown in FIG. 3. These rods may have a length so as to be resonant at X-band radio frequencies. The disk is rotated about its center, and the metal rods act as reflectors to induce positive and negative Doppler components in the remote signal.

When disk 17' is used instead of endless belt 17 an amplitude component is induced over the Doppler component because the number of reflectors within the field of view varies as the disk spins. A very large wheel having closely spaced rods in which a very small part of the circumference is used would help solve the amplitude variation problem. However, mechanical considerations suggest a small disk.

Therefore, the endless belt concept is preferred over the rotating disk.

What is claimed is:
1. An induced Doppler direction finder comprising:
   an array of reflectors for reflecting a remote signal the bearing of which is to be determined;
   means for moving said reflectors at a constant speed to induce Doppler components in the remote signal;
   a first channel receiving the remote signal;
   a second channel receiving the positive Doppler shifted signal reflected from the reflecting antennas;
   a third channel receiving the negative Doppler shifted signal reflected from the reflecting antennas;
   means for detecting the signal received by the first channel;

means for detecting the signal received by the second channel;

means for detecting the signal received by the third channel;

means for mixing the detected signals from the first and second channels and extracting a positive Doppler component therefrom;

means for mixing the detected signals from the first and third channels and extracting a negative Doppler component therefrom; and signal processing means for combining the extracted positive and negative Doppler components to determine the bearing of the remote signal.

2. The system of claim 1 wherein the array of reflectors and the means to move said reflectors comprise:

a disk having a plurality of metal rods inserted radially into its rim; and means for rotating said disk about its center.

3. The system of claim 2 wherein the metal rods have a length so as to be resonant at X-band ratio frequencies.

4. The system of claim 1 wherein the array of reflectors and the means to move said reflectors comprise:

an endless belt having a plurality of randomly spaced metal reflectors attached thereto;

an idler roller;

a drive roller; and said belt being disposed on the rollers for movement.

5. The system of claim 4 wherein absorbing material is placed inside the space enclosed by said belt to reduce reflection of the remote signal.

References Cited

UNITED STATES PATENTS 3,438,036   4/1969   Bennett   343—113

RODNEY D. BENNETT, Jr., Primary Examiner

R. E. BERGER, Assistant Examiner